3,029,837
SPRAY APPARATUS
Howard H. Neudeck, 1953 Dean Road, Jacksonville, Fla.
Filed June 20, 1960, Ser. No. 37,345
6 Claims. (Cl. 137—564.5)

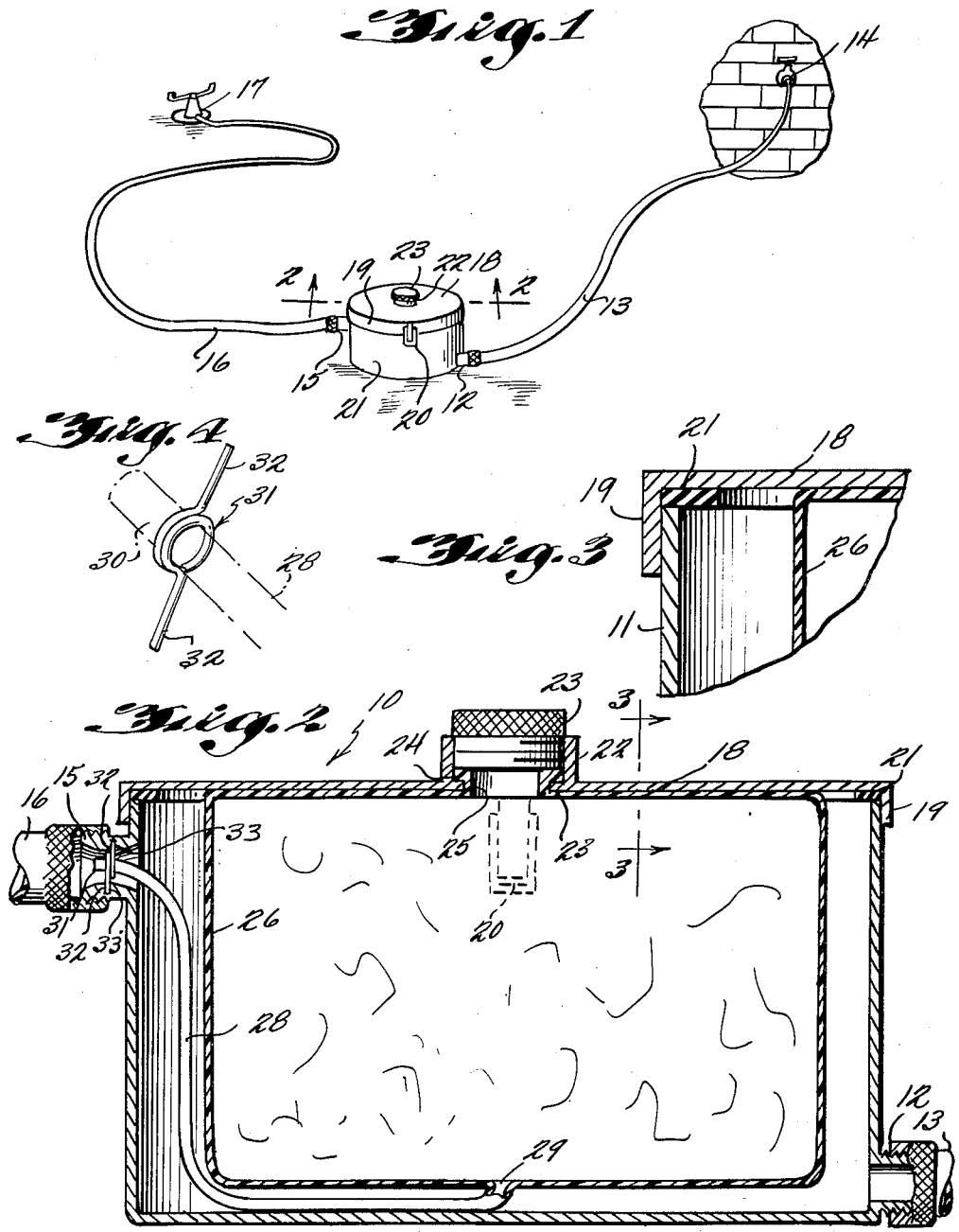

This invention relates to a spray apparatus, and more particularly to an apparatus for spraying insecticide, weed killer, fertilizer or the like on a garden or lawn.

A primary object of this invention is the provision of such a device comprised of a fixed container carrying a predetermined amount of weed killer or insecticide or other similar ingredient which is disseminated by water sprayed therethrough, so that it is evenly diffused, as by a sprinkler, over the area to be treated.

An additional object of the invention is the provision of such a device which can remain fixed in a required location, thus obviating the necessity of carrying a tank of spray about from place to place.

A further object of the invention is the provision of such a device wherein the spraying and the dissemination of the insecticide and the like into the water is effected substantially automatically and without the necessity for manual control.

A further object of the invention is the provision of a device of this character which is sturdy and durable in construction, reliable and efficient in operation, and relatively simple and inexpensive to manufacture and utilize.

Other objects will in part be obvious and in part be pointed out as the description of the invention proceeds, and shown in the accompanying drawing wherein there is disclosed the preferred embodiment of this inventive concept.

In the drawing:

FIGURE 1 is a perspective view of one form of the spray apparatus constructed in accordance with the instant invention shown as connected to a source of water and a sprinkler.

FIGURE 2 is an enlarged vertical sectional view taken substantially along the line 2—2 of FIG. 1 as viewed in the direction indicated by the arrows.

FIGURE 3 is a fragmentary enlarged detail sectional view taken substantially along the line 3—3 of FIG. 1 as viewed in the direction indicated by the arrows.

FIGURE 4 is an enlarged perspective view of a constructional detail.

Similar reference characters refer to similar parts throughout the several views of the drawing.

Having reference now to the drawings in detail, the device of the instant invention, generally indicated at 10, comprises a tank or receptacle 11, of any desired type, and which may be constructed of any desired material. The tank 11 is preferably of a rigid construction, and includes an inlet pipe 12, which is suitably threaded for attachment to a hose 13, which extends to a faucet 14 or other water outlet. If desired, the fitting 12 may be connected directly to the faucet.

Tank 11 is also provided with an outlet fitting 15, which is threaded for attachment to a hose 16, which in turn may be connected to a sprinkler 17, or a nozzle, or the like, for dissemination of the spray at any desired location.

In the illustrative embodiment of the invention shown the tank 11 is shown as provided with a cover 18, which has a flange 19 which engages over the upper rim of the tank or receptacle 11, and which is secured in position by means of conventional fastening elements 20 over a suitable sealing gasket 21.

The center of cover 18 is provided with an inlet, which includes an upstanding interiorly threaded member 22 into which is threadedly engaged a cap or closure 23. Member 22 is provided with an internal annular flange 24 over which is fitted a hard rubber flanged rim 25 which surrounds an opening in a flexible resilient inner bag or container 26.

The inner receptacle 26 is provided with an outlet pipe 28, which opens as at 29 into the center of the bottom of inner container 26, and which extends up to the outlet pipe 15, the end 30 thereof projecting into the pipe a short distance, and being held therein by means of a looped fitting 31 which surrounds the end 30 and is provided with projections 32 (see FIG. 4) which extend into suitable openings in the inner wall of outlet fitting 15. The interior of outlet fitting 15 about the end 30 of pipe 28 is constructed as at 33 to provide a venturi effect.

In the use and operation of the device a desired quantity of weed killer or other material is placed in the container 26 through the inlet 25. Suitable attachment is made of the hoses 13 and 16 to their respective faucet and sprinkler, and water is turned on from the faucet 14. The water flowing through the tank 11 creates a venturi effect in inner flexible container 26. As the water flows past the end 30 of the tube 28 within constricted portion 33 a suction or venturi effect is created which draws the insecticide or other fluid from the interior of the receptacle 26 and passes the same to the sprinkler 17 where it is diffused over the area to be treated. All back pressure from the sprinkler is thus avoided since the external and internal pressure in container 26 is substantially equal while water flows to the sprinkler and the contents thereof are removed only by suction created by the flowing water.

It will be seen that the tank 11 may be positioned in any desired locality, and remain immovable. The only necessity for movement occurs in the moving of the sprinkler from place to place as may be necessary to provide a wide distribution of the material being sprayed.

It will also be seen that there is herein provided an improved spray apparatus which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a spray apparatus, the combination of an outer rigid receptacle having a water inlet adapted for connection to a faucet and a water outlet fitting adapted for connection to a sprinkler, and an inner flexible container spaced from the outer container over a major portion of the surface area and having an inlet for the introduction of a liquid to be disseminated, said inner container having an outlet tube extending therefrom concentrically into the outlet fitting of said outer receptacle, said outlet fitting having wall portions defining a venturi passage, and said outlet tube from said inner container terminating in said venturi passage in concentric relation thereto.

2. The structure of claim 1 wherein said outer receptacle is provided with a cover having an opening therein and said inlet for the introduction of a liquid into said inner container comprises a flexible member secured in said opening.

3. The structure of claim 2 wherein said opening in said opening in said cover is provided with an annular flange, and an annular ring is provided on the mouth of said flexible inlet member of said inner container engageable with said flange to secure said inner container in position.

4. A device for mixing an additive fluid solution to water comprising a rigid outer container having water inlet means at the bottom of the container at one side thereof and a water outlet fitting adjacent the top of the container at an opposite side thereof, a flexible inner container disposed in concentrically spaced relation to the outer container over a major portion of the surface area, a flexible discharge tube connected with the bottom of the inner container, said discharge tube terminating in said outlet fitting, means supporting the terminal end of the tube centrally in the outlet fitting, said outlet fitting including a venturi passage concentrically surrounding the discharge tube adjacent the terminal end thereof, and means extending through the walls of both containers for supplying additive solution to the inner container.

5. The structure as defined in claim 4 wherein said means supporting the discharge tube in the outlet fitting includes a wire member having a central loop frictionally surrounding said tube, said wire member having radially extending ends at opposite sides of the loop for engagement with recesses in the inner surface of the outlet fitting thereby mounting the tube in the outlet fitting.

6. In a spray apparatus, the combination of an outer rigid receptacle having a water inlet in one wall thereof, a flexible mix container positioned in said rigid receptacle and spaced from the inner walls thereof over a major portion of its area, a cover removably positioned on said rigid receptacle, portions of said cover defining an opening therein, said flexible mix container having portions defining an opening therein in alignment with the opening in said cover, closure means removably positioned in the opening in said cover, portions of said rigid receptacle defining an outlet having a venturi passage, a flexible outlet tube integral with said flexible mix container extending therefrom and terminating in said venturi passage, and means mounted on the free end of said flexible outlet tube and in engagement with the walls of said venturi passage to concentrically position the free end of said tube in said venturi passage.

References Cited in the file of this patent

UNITED STATES PATENTS

| | | |
|---|---|---|
| 2,153,240 | Dailey et al. | Apr. 4, 1939 |
| 2,404,549 | Thomas | July 23, 1946 |
| 2,571,424 | Dailey | Oct. 16, 1951 |
| 2,624,619 | Fletcher et al. | Jan. 6, 1953 |

FOREIGN PATENTS

| | | |
|---|---|---|
| 315,400 | Switzerland | Sept. 29, 1956 |
| 727,213 | Germany | Oct. 29, 1942 |
| 727,492 | Great Britain | Apr. 6, 1955 |
| 937,787 | Germany | Jan. 12, 1956 |